United States Patent [19]

Fukami et al.

[11] Patent Number: 5,071,939

[45] Date of Patent: Dec. 10, 1991

[54] METHOD FOR PREPARING POLYISOCYANURATE COMPOSITE

[75] Inventors: Takao Fukami, Fujisawa; Hirokazu Oka; Koji Kanaya, both of Yokohama, all of Japan

[73] Assignee: Nippon Polyurethane Industry Co., Ltd., Tokyo, Japan

[21] Appl. No.: 481,711

[22] Filed: Feb. 15, 1990

Related U.S. Application Data

[63] Continuation of Ser. No. 206,019, Jun. 10, 1988, abandoned.

[30] Foreign Application Priority Data

Jun. 12, 1987 [JP] Japan ................................ 62-145272

[51] Int. Cl.$^5$ ............................................ C08G 18/20
[52] U.S. Cl. .................................... 528/53; 528/54; 264/257; 264/328.1; 264/328.2; 264/328.6; 428/422.8
[58] Field of Search ............... 528/53, 54; 264/257, 264/328.2, 328.1, 328.6; 428/422.8

[56] References Cited

U.S. PATENT DOCUMENTS

| | | | |
|---|---|---|---|
| 3,745,133 | 7/1973 | Communale et al. | 260/2.5 |
| 3,799,896 | 3/1974 | Moss et al. | 260/2.5 |
| 4,282,285 | 8/1981 | Mohiuddin | 264/46.6 |
| 4,340,562 | 7/1982 | Gross et al. | 264/328.6 |
| 4,435,349 | 3/1984 | Dominiquez et al. | 264/257 |
| 4,481,309 | 11/1984 | Straehle et al. | 521/173 |
| 4,692,291 | 9/1987 | Angell, Jr. | 264/102 |
| 4,709,002 | 11/1987 | Younes | 528/53 |
| 4,714,575 | 12/1987 | Preston | 264/257 |

OTHER PUBLICATIONS

JIS K 7113.
JIS K 7112.
JIS K 7110.
JIS K 7203.

*Primary Examiner*—Maurice J. Welsh
*Attorney, Agent, or Firm*—Davis Hoxie Faithfull & Hapgood

[57] ABSTRACT

A method for preparing a polyisocyanurate composite obtained by injecting a formulated liquid comprises an organic polyisocyanate, a polyol and a trimerization catalyst into a mold in which a fibrous reinforcing material is previously set by use of a reaction injection molding machine, wherein:

(1) a single or mixed polyether polyol having a hydroxyl value of 40 to 400 is used as the polyol; and
(2) the formulation ratio of the organic polyisocyanate and the polyol in terms of the isocyanurated isocyanate concentration [NCO]$_T$ defined by the following formula (1) is in the range of 3.0 to 5.5 mmol/g:

$$[NCO]_T = [NCO]_O \times W_A - \frac{OH \cdot V}{56.11} \times (1 - W_A) \quad (1)$$

[NCO]$_T$: theoretical concentration of isocyanate group consumed in isocyanuration;
[NCO]$_O$: isocyanate group concentration in organic polyisocyanate (mmol/g);
OH-V: hydroxyl value of single or mixed polyol;
W$_A$: weight fraction of organic polyisocyanate.

18 Claims, No Drawings

METHOD FOR PREPARING POLYISOCYANURATE COMPOSITE

This is a continuation of copending application Ser. No. 07/206,019 filed on June 10, 1988 and now abandoned.

BACKGROUND OF THE INVENTION

1. Field of the Invention

This invention relates to a rapid curable method for preparing a polyisocyanurate composite which is highly rigid and excellent in heat resistance.

2. Related Background Art

In the art of fiber reinforced plastics (FRP) molding technique, the method of obtaining a FRP by injecting a thermosetting resin reaction liquid such as unsaturated polyester resin, vinyl ester resin, epoxy resin, etc. into a mold in which a fibrous reinforcing material is previously set has been generally called the resin injection method or the resin transfer molding method and known as the method with good economical efficiency utilizing in-mold polymerization.

In industrial fields, particularly the field of automotive industry, it has been demanded to manufacture structural materials having heat resistance in short molding cycle time. However, in the above method, no material satisfactory in both aspects of rapid curability and heat resistance has been obtained.

On the other hand, in the field of polyurethane elastomer, the reaction injection molding (hereinafter called RIM) technique has been well developed and applied particularly to molding of bumper, facia, etc. of automobile. Since this technique is suitable for manufacturing large size molding, specific features reside in that integration of a large number of parts is possible, and also that the molding cycle time is by far shorter as compared with the above resin injection method.

In recent years, it has been attempted to obtain a composite of thermosetting resin by means of rapid curing by combining the RIM technique with the resin injection method.

More specifically, it is a method in which a fibrous reinforcing material is previously set in a mold, and a thermosetting resin reaction liquid is injected by a RIM machine into the mold.

However, with the reaction liquid for RIM of the prior art, particularly in the case of polyurethane, the reaction begins simultaneously with mixing to cause increase in viscosity, whereby there is the problem that penetrability into the fibrous reinforcing material is inferior. Also, other RIM systems have been investigated, but no material satisfactory in such points as penetrability, rapid curability, high rigidity, heat resistance, etc. has been obtained.

The present inventors have intensively studied in order to obtain a composite having high rigidity and heat resistance in short molding cycle time by rapid curing, and consequently accomplished the present invention.

SUMMARY OF THE INVENTION

According to the present invention, there is provided a method for preparing a polyisocyanurate composite obtained by injecting a formulated liquid comprising an organic polyisocyanate, a polyol and a trimerization catalyst into a mold in which a fibrous reinforcing material is previously set by use of a reaction injection molding machine, wherein:

(1) a single or mixed polyether polyol having a hydroxyl value of 40 to 400 is used as the polyol; and (2) the formulation ratio of the organic polyisocyanate and the polyol in terms of the isocyanurated isocyanate group $[NCO]_T$ defined by the following formula (1) is in the range of 3.0 to 5.5 mmol/g:

$$[NCO]_T = [NCO]_O \times W_A \frac{OH - V}{56.11}(1 - W_A) \quad (1)$$

in which $[NCO]_T$: theoretical concentration of isocyanate group consumed in isocyanuration;

$[NCO]_O$: isocyanate group concentration of organic polyisocyanate (mmol/g);

OH-V: hydroxyl value of single or mixed polyol;

$W_A$: weight fraction of organic polyisocyanate.

DETAILED DESCRIPTION OF THE PREFERRED EMBODIMENTS

In the present invention, by combining the polyol having a hydroxyl value of 40 to 400, the concentration of isocyanurated isocyanate group $[NCO]_T$ which is 3.0 to 5.5 mmol/g and a fibrous reinforcing material, excellent characteristics well balanced in both aspects of moldability of a formulated liquid and physical properties of a prepared polymer can be obtained.

As moldability of the formulated liquid according to the present invention, viscosity increase by urethane reaction at the initial stage can be gently suppressed, whereby penetrability, fillability into the fibrous reinforcing material are excellent, and also the isocyanuration reaction becomes the main reaction after completion of filling to be rapidly cured and therefore demolding within a short time (usually 1 to 3 minutes) can be accomplished. In other words, the isocyanuration reaction exhibits generally "S-form" reaction behaviors, with the reaction at the initial stage of mixing being very slow substantially without viscosity increase at the initial stage of the reaction.

In aspect of physical properties, the prepared polymer can retain both of excellent impact resistance possessed by polyurethane and excellent heat resistance possessed by polyisocyanurate.

Examples of organic polyisocyanates available in the present invention may include aliphatic polyisocyanates such as hexamethylene-1,6-diisocyanae, 2,2,4- or 2,4,4-trimethylhexamethylene-1,6-diisocyanate, etc.; alicyclic polyisocyanates such as cyclohexane-1,4-diisocyanate, dicyclohexylmethane-4,4'-diisocyanate, etc.; aromatic polyisocyanates such as p-phenylene diisocyanate, tolylene-2,4- or -2,6-diisocyanate, diphenylmethane-2,4- or -4,4'-diisocyanate, naphthylene-1,5-diisocyanate, xylylene-1,3- or -1,4-diisocyanate, diphenyl ether-4,4'-diisocyanate, etc.

It is also possible to use a polyphenylene polymethylene polyisocyanate of the type obtained by condensation of aniline and formalin before phosgenation, or diphenylmethane diisocyanates liquid at normal temperature having carbodiimide group or uretonimine group, or modified polyisocyanates containing urethane bond, allophanate bond, biuret bond and urethidione ring, etc. Isocyanate based prepolymers obtained by the reaction by use of an excess of the above polyisocyanate and polyols can be also employed.

Of these are preferred those which are liquid and have low viscosity at normal temperature, diphenylmethane-4,4'-diisocyanate or polyphenylene polymethylene polyisocyanate, etc having carbodiimide group or uretonimine group.

The polyol which can be used in the present invention is a single or mixed polyether polyol having a hydroxyl value of 40 to 400, preferably 50 to 300. Representative examples of polyether polyol may include polyether polyols obtained by addition of ethylene oxide, propylene oxide, etc. to polyols such as propylene glycol, glycerine, trimethylolpropane, pentaerythritol, α-methylglycoside, cane sugar etc.; aminoalcohols such as diethanolamine, triethanolamine, tripropanolamine, etc.; amines such as ethylene diamine, 1,6-hexanediamine, diethylenetriamine, triethylenetetramine, toluylenediamine, methylenebisaniline and the like; phosphorus compounds such as phosphoric acid, pyrophosphoric acid or partial esters of these; and mixtures of these.

Also, there may be included halo-containing polyether polyols having a hydroxyl value within the above range obtained by addition of epihalohydrins to polyols such as glycerine, trimethylolpropane, pentaerythritol, sorbitol, etc. in the presence of a cationic catalyst such as $BF_3$, etc.

In the present invention, the organic polyisocyanate and the polyol are formulated at a ratio so that the isocyanurated isocyanate concentration may be within the range of 3.0 to 5.5 mmol/g preferably 3.5 to 5.0 mmol/g.

In this case, if the concentration of isocyanurated isocyanate group $[NCO]_T$ is less than 3.0 mmol/g, viscosity increase at the initial stage of mixing is so excessive, whereby it is difficult to control the reaction with the trimerization catalyst, that penetrability into the fibrous reinforcing material is poor to give, and only a material with low mechanical strength under elevated temperature is obtained. If the concentration of isocyanurated isocyanate group $[NCO]_T$ exceeds 5.5 mmol/g, drawbacks such as remarkable lowering in impact resistance may be caused to occur.

Examples of the trimerization catalyst which can be used in the present invention may include tertiary amines such as triethylamine, N-methylmorpholine, 2,4,6-tris(dimethylaminomethyl)phenol, 2,4,6-tris(dialkylaminoalkyl)hexahydro-S-triazine, aziridine compounds, etc.; phosphines as represented by triethylphosphine; alkali metal salts such as potassium acetate, potassium 2-ethylhexanoate, etc.; further co-catalyst systems of tertiary amine and epoxy compound, carbamate compound, etc. These trimerization catalysts can be also used as a mixture.

Among the trimerization catalysts, preferable catalyst is a co-catalyst system of a tertiary amine and an epoxy compound, particularly preferably a co-catalyst system of triethylenediamine or 2-methyltriethylenediamine and an epoxy compound.

In the present invention, if necessary, flame retardants, plasticizers, colorants, various fillers, inner mold releasing agents and other processing additives can be used by addition.

Also in the present invention, for the purpose of making the molded product light weight or improving flowability by lowering the viscosity of the stock liquid, blowing agent and/or water (which reacts with isocyanate to generate carbon dioxide gas) can be added in the stock liquid or alternatively a gas can be mixed and dissolved into the stock liquid by means of an air loading equipment in carrying out molding, thereby mixing intentionally gas bubbles into the molded product.

For the fibrous reinforcing material which can be used in the present invention, there can be included chopped strand mat, continuous strand mat, surfacing mat, glass cloth, roving cloth, etc. Also, carbon fibers, aramide fibers can be similarly used. The above fibrous reinforcing materials can be also used in combination of two or more kinds.

For these fibrous reinforcing materials, it is particularly preferable to use a glass continuous strand mat partially or singly.

By use of a continuous strand mat singly or in combination with another fibrous reinforcing material, penetrability of the formulating liquid can be improved to enhance filling characteristic, and therefore uniform molded product can be obtained.

In the present invention, if necessary, various metal meshes, network moldings of synthetic resins can be also used in combination with the fibrous reinforcing material.

The polyisocyanurate composition which is obtained in short molding cycle time by the present invention is excellent in moldability, and yet has excellent heat resistance, rigidity, and therefore it is extremely useful as structural material for bumper beam, floor panel, door inner panel, various trays in the field of automobile; housing cases in the field of electricity; and other general industrial members.

[Examples]

The present invention is described in more detail by referring to Examples, but the present invention is not limited thereto.

The physical properties of polymer products were measured at 25° C. according to the following methods.
Specific gravity: according to JIS K-7112
Flexural modulus, flexural strength: according to JIS K-7203
Tensile strength, elongation: according to JIS K-7113
Izod impact, notched: according to JIS K-7110

EXAMPLES 1-3, AND COMPARATIVE EXAMPLES 1, 2

Previously, a glass continuous strand mat was set in a mold cavity, and the two components of the component A (organic polyisocyanate and epoxy compound) shown in Table 2 and the component B (polyol and tertiary amines) shown in Table 2 were injected thereinto by use of a high pressure reaction injection molding machine (MC-102 Model, produced by Polyurethane Engineering), followed by curing to give a test plate.

During this operation, the molding was carried out by varying the concentration of isocyanurated isocyanate group $[NCO]_T$.

The molding conditions are shown in Table 1, and the recipes and the results in Table 2 and Table 3.

TABLE 1

| Molding condition | |
|---|---|
| Mold shape | Flat plate |
| Liquid temperature | 35 ± 2° C. |
| Mold temperature | 70 ± 2° C. |
| Demolding time | one minute |

TABLE 2

| | Item | | Example 1 | Example 2 | Example 3 | Comparative example 1 | Comparative example 2 |
|---|---|---|---|---|---|---|---|
| Formulation (parts by weight) | Components A | Millionate MTL[1] | 69.1 | 69.1 | 82.9 | 62.6 | 90.3 |
| | | Phenylglycidyl ether | 3.0 | 3.0 | 3.0 | 3.0 | 3.0 |
| | Components B | Adeka polyether[2] CM54 | 30.9 | 30.9 | 17.1 | 37.4 | 9.7 |
| | | DABCO[3] | 0.2 | 0.2 | 0.2 | 0.2 | 0.2 |
| Hydroxy value of polyol | | | 225 | 225 | 225 | 225 | 225 |
| $[NCO]_T$ (mmol/g) | | | 3.5 | 3.5 | 5.0 | 2.8 | 5.8 |
| M8609[4] (Wt %) | | | 23–24 | 34–35 | 23–24 | 23–24 | 23–24 |

Note to Table 2
[1]Organic polyisocyanate (liquid diphenylmethane diisocyanate containing carbodiimide; NCO-content 28.8%) produced by Nippon Polyurethane Industry Co., Ltd, trade name
[2]Polyether polyol (hydroxyl value 225), produced by Asahi Denka Kogyo, trade name
[3]Triethylenediamine, produced by Sankyo Air products, trade name
[4]Glasslon continuous strand mat, produced by Asahi Fiberglass, trade name

TABLE 3

| | Item | Example 1 | Example 2 | Example 3 | Comparative example 1 | Comparative example 2 |
|---|---|---|---|---|---|---|
| Physical properties | Specific gravity | 1.33 | 1.38 | 1.34 | 1.32 | 1.34 |
| | Flexural modulus (kgf/cm$^2$) | 62,000 | 75,000 | 65,000 | 51,000 | 66,000 |
| | Flexural strength (kgf/cm$^2$) | 1,820 | 2,010 | 1,900 | 1,530 | 1,500 |
| | Tensile strength (kgf/cm$^2$) | 840 | 1,100 | 850 | 820 | 700 |
| | Elongation (%) | 2 | 2 | 2 | 2 | 1 |
| | Izod impact (kgf cm/cm) | 37 | 46 | 32 | 38 | 22 |
| | Flexural modulus (kg/cm$^2$ at 140° C.) | 39,000 | 54,000 | 42,000 | 22,000 | 42,000 |
| | 140° C./25° C. Flexural modulus retention (%) | 63 | 72 | 65 | 43 | 64 |

EXAMPLES 4–7 AND COMPARATIVE EXAMPLES 3, 4

The molding was carried out by varying the hydroxyl value of polyol. The molding methods, molding conditions, etc. were the same as in Examples 1–3 and Comparative examples 1, 2 to obtain molded products, and the recipes and the results of measurement of the physical properties of the molded products are shown in Table 4 and Table 5.

TABLE 4

| | Item | | Example 4 | Example 5 | Example 6 | Example 7 | Comparative example 3 | Comparative example 4 |
|---|---|---|---|---|---|---|---|---|
| Formulation (parts by weight) | Components A | Millionate[1] MR200 | 76.7 | 65.6 | 68.4 | 71.3 | 83.4 | 64.6 |
| | | Epikote[7] 828 | 4.0 | 5.0 | — | 4.0 | 4.0 | — |
| | Components B | SANNIX[2] PP-200 | — | — | 3.7 | — | 16.6 | — |
| | | Adeka polyether[3] CM-43 | 23.3 | — | — | 12.0 | — | — |
| | | Adeka polyether[4] AM-302 | — | 34.4 | — | 16.7 | — | — |
| | | Adeka polyether[5] AM-502 | — | — | 27.9 | — | — | 35.9 |
| | | Methyl[6] DABCO | 0.2 | 0.5 | — | 0.2 | 0.2 | — |
| | | Potassium 2-ethylhexanoate | — | 0.1 | 0.2 | 0.1 | — | 0.2 |
| Hydroxyl value of polyol | | | 280 | 56 | 98 | 150 | 560 | 36 |
| $[NCO]_T$ (mmol/g) | | | 4.5 | 4.5 | 4.5 | 4.5 | 4.5 | 4.5 |
| M8609 (Wt %) | | | 25–26 | 25–26 | 25–26 | 25–26 | 25–26 | 25–26 |

Note to Table 4:
[1]trade name of polyphenylene polymethylene polyisocyanate, (NCO content of 31.0%), produced by Nippon Polyurethane Industry Co., Ltd.;
[2]trade name of polypropylene glycol, (hydroxyl value of 560), produced by Sanyo Kasei Kogyo;
[3]trade name of polyether polyol, (hydroxyl value of 280), produced by Asahi Denka Kogyo;
[4]trade name of polyether polyol, (hydroxyl value of 56), produced by Asahi Denka Kogyo;
[5]trade name of polyether polyol, (hydroxyl value of 36), produced by Asahi Denka Kogyo;
[6]2-methyltriethylenediamine, produced by Sankyo Air products;
[7]trade name of bisphenol A, epichlorohydrin condensation type epoxy resin, produced by Yuka-Shell Epoxy.

TABLE 5

| | Item | Example 4 | Example 5 | Example 6 | Example 7 | Comparative example 3 | Comparative example 4 |
|---|---|---|---|---|---|---|---|
| Physical properties | Specific gravity | 1.34 | 1.34 | 1.32 | 1.33 | 1.34 | 1.32 |
| | Flexural modulus (kgf/cm$^2$) | 65,000 | 60,000 | 58,000 | 63,000 | 67,000 | 51,000 |
| | Flexural strength (kgf/cm$^2$) | 1,780 | 1,640 | 1,620 | 1,720 | 1,380 | 1,540 |
| | Tensile strength (kgf/cm$^2$) | 890 | 920 | 890 | 900 | 820 | 810 |
| | Elongation (%) | 2 | 2 | 2 | 2 | 2 | 2 |
| | Izod impact (kgf cm/cm) | 34 | 30 | 31 | 34 | 35 | 26 |
| | Flexural modulus (kgf/cm$^2$ at 140° C.) | 45,000 | 48,000 | 42,000 | 43,000 | 25,000 | 33,000 |
| | 140° C./25° C. Flexural modulus retention % | 78 | 80 | 65 | 68 | 37 | 65 |

We claim:

1. A polyisocyanurate composite obtained by injecting a formulated liquid by the reaction injection molding process into a mold in which a continuous strand fibrous reinforcing material is previously set, which formulated liquid comprises an organic polyisocyanate, a polyol which is a single or mixed polyether polyol having a hydroxyl value of 40 to 400 and a trimerization catalyst which is a co-catalyst of a tertiary amine and an epoxy compound, wherein the formulation ratio of the organic polyisocyanate and the polyol in terms of the isocyanurated isocyanate concentration [NCO]$_T$ defined by the following formula (1) is in the range of 3.0 to 5.5 mmol/g:

$$[NCO]_T = [NCO]_O \times W_A - \frac{OH \cdot V}{56.11} \times (1 - W_A) \quad (1)$$

[NCO]$_T$: theoretical concentration of isocyanate group consumed in isocyanuration;
[NCO]$_O$: isocyanate group concentration of organic polyisocyanate (mmol/g);
OH-V: hydroxyl value of single or mixed polyol;
W$_A$: weight fraction of organic polyisocyanate.

2. The product of claim 1 wherein the organic polyisocyanate is a liquid diphenylmethane diisocyanate modified with a carbodiimide or uretonimine group.

3. The product of claim 1 wherein the trimerization catalyst is a cocatalyst of triethylenediamine with an epoxy compound.

4. The product of claim 1 wherein the trimerization catalyst is a cocatalyst of 2-methyltriethylenediamine with an epoxy compound.

5. The product of claim 1 wherein the continuous strand fibrous reinforcing material is a glass continuous strand mat.

6. The product of claim 1 wherein the continuous strand fibrous reinforcing material is used in combination with another fibrous reinforcing material.

7. A reaction mixture for preparing a polyisocyanurate composite by reaction injection molding, which reaction mixture comprises:
a) an organic polyisocyanate;
b) a polyol which is a single or mixed polyether polyol having a hydroxyl value of 40 to 400;
c) a trimerization catalyst which is a co-catalyst of a tertiary amine and an epoxy compound; and
d) a continuous strand fibrous reinforcing material; wherein the formulation ratio of the organic polyisocyanate and the polyol in terms of the isocyanurated isocyanate concentration [NCO]$_T$ defined by the following formula (1) is in the range of 3.0 to 5.5 mmol/g:

$$[NCO]_T = [NCO]_O \times W_A - \frac{OH \cdot V}{56.11} \times (1 - W_A) \quad (1)$$

[NCO]$_T$: theoretical concentration of isocyanate group consumed in isocyanuration;
[NCO]$_O$: isocyanate group concentration of organic polyisocyanate (mmol/g);
OH-V: hydroxyl value of single or mixed polyol;
W$_A$: weight fraction of organic polyisocyanate.

8. The product of claim 7 wherein the organic polyisocyanate is a liquid diphenylmethane diisocyanate modified with a carbodiimide or uretonimine group.

9. The product of claim 7 wherein the trimerization catalyst is a cocatalyst of triethylenediamine with an epoxy compound.

10. The product of claim 7 wherein the trimerization catalyst is a cocatalyst of 2-methyltriethylenediamine with an epoxy compound.

11. The product of claim 7 wherein the continuous strand fibrous reinforcing material is a glass continuous strand mat.

12. The product of claim 7 wherein the continuous strand fibrous reinforcing material is used in combination with another fibrous reinforcing material.

13. A process for forming a polyisocyanurate composite comprising injecting a formulated liquid by reaction injection molding into a mold in which a continuous strand fibrous reinforcing material is previously set, which formulated liquid comprises an organic polyisocyanate, a polyol and a trimerization catalyst, which trimerization catalyst is a co-catalyst of a tertiary amine and an epoxy compound, wherein the tertiary amine and the co-catalyst are mixed in separate streams during the reaction injection molding, and further wherein the polyol is a single or mixed polyether polyol having a hydroxyl value of 40 to 400, and the formulation ratio of the organic polyisocyanate and the polyol in terms of the isocyanurated isocyanate concentration [NCO]$_T$ defined by the following formula (1) is in the range of 3.0 to 5.5 mmol/g:

$$[NCO]_T = [NCO]_O \times W_A - \frac{OH \cdot V}{56.11} \times (1 - W_A) \quad (1)$$

[NCO]$_T$: theoretical concentration of isocyanate group consumed in isocyanuration;

[NCO]$_O$: isocyanate group concentration of organic polyisocyanate (mmol/g);

OH-V: hydroxyl value of single or mixed polyol;

W$_A$: weight fraction of organic polyisocyanate.

14. The process of claim 13 wherein the organic polyisocyanate is a liquid diphenylmethane diisocyanate modified with a carbodiimide or uretonimine group.

15. The process of claim 13 wherein the trimerization catalyst is a cocatalyst of triethylenediamine with an epoxy compound.

16. The process of claim 13 wherein the trimerization catalyst is a cocatalyst of 2-methyltriethylenediamine with an epoxy compound.

17. The process of claim 13 wherein the continuous strand fibrous reinforcing material is a glass continuous strand mat.

18. The process of claim 13 wherein the continuous strand fibrous reinforcing material is used in combination with another fibrous reinforcing material.

* * * * *